(12) United States Patent
Fomichev

(10) Patent No.: US 7,721,025 B2
(45) Date of Patent: May 18, 2010

(54) REUSING TASK OBJECT AND RESOURCES

(75) Inventor: Dmitry Fomichev, Bridgewater, NJ (US)

(73) Assignee: RELDATA, Inc., Parsippany, NY (US)

( * ) Notice: Subject to any disclaimer, the term of this patent is extended or adjusted under 35 U.S.C. 154(b) by 199 days.

(21) Appl. No.: 11/470,539

(22) Filed: Sep. 6, 2006

(65) Prior Publication Data

US 2007/0073886 A1 Mar. 29, 2007

Related U.S. Application Data

(60) Provisional application No. 60/714,401, filed on Sep. 6, 2005.

(51) Int. Cl.
*G06F 3/00* (2006.01)

(52) U.S. Cl. .......................... 710/52; 710/56

(58) Field of Classification Search .................... 710/56
See application file for complete search history.

(56) References Cited

U.S. PATENT DOCUMENTS

| 6,895,461 B1 * | 5/2005 | Thompson .................. 710/305 |
| 7,206,890 B2 * | 4/2007 | Mathiske ........................ 711/6 |
| 2004/0044856 A1 * | 3/2004 | Umbehocker et al. ........ 711/154 |

* cited by examiner

*Primary Examiner*—Henry W. H. Tsai
*Assistant Examiner*—Juanito C Borromeo
(74) *Attorney, Agent, or Firm*—Wayne F. Reinke, Esq.; Heslin Rotherberg Farley & Mesiti P.C.

(57) ABSTRACT

A session-level cache provides space to reuse a task object and associated memory resources for a new request. Any additional resources necessary for the task are allocated by the system memory allocator.

8 Claims, 1 Drawing Sheet

REUSING TASK OBJECT AND RESOURCES

CROSS-REFERENCE TO RELATED APPLICATIONS

This application claims priority under 35 U.S.C. §119 to U.S. Provisional Application No. 60/714,401, filed Sep. 6, 2005, which is herein incorporated by reference in its entirety.

This application contains subject matter which is related to the subject matter of the following applications, each of which is assigned to the same assignee as this application and filed on the same day as this application. Each of the below listed applications is hereby incorporated herein by reference in its entirety:

U.S. patent application Ser. No. 11/470,551, by Kirill Malkin, entitled "STORAGE RESOURCE SCAN"

U.S. patent application Ser. No. 11/470,550, by Malkin et al., entitled "REDUNDANT APPLIANCE CONFIGURATION REPOSITORY IN STANDARD HIERARCHICAL FORMAT"

U.S. patent application Ser. No. 11/470,548, by Malkin et al., entitled "LIGHTWEIGHT MANAGEMENT AND HIGH AVAILABILITY CONTROLLER"

U.S. patent application Ser. No. 11/470,545, by Kirill Malkin, entitled "BLOCK SNAPSHOTS OVER iSCSI"

U.S. patent application Ser. No. 11/470,544, by Kirill Malkin, entitled "GENERATING DIGEST FOR BLOCK RANGE VIA iSCSI"

U.S. patent application Ser. No. 11/470,542, by Kirill Malkin, entitled "INCREMENTAL REPLICATION USING SNAPSHOTS"

U.S. patent application Ser. No. 11/470,537, by Kirill Malkin, entitled "PERFORMANCE IMPROVEMENT FOR BLOCK SPAN REPLICATION"

BACKGROUND OF THE INVENTION

1. Technical Field

The present invention generally relates to allocating task objects. More particularly, the present invention relates to reusing previous task objects and associated resources for new tasks.

2. Background Information

SCSI (Small Computer System Interface) is a set of standards to provide interoperability between conforming systems, primarily between storage devices and client hosts. Compliant client hosts are called SCSI initiators and compliant storage servers are called SCSI targets. SCSI devices may communicate with each other using various physical links (aka transport protocols)—parallel and serial interfaces, fiber channel links, TCP/IP, etc.

The main path of SCSI operation is performed as follows. A SCSI initiator sends commands (requests) to a SCSI target for execution and once the request is completed, the target returns an appropriate response to the client initiator. SCSI commands and responses may be accompanied with significant amount of data, which, in turn, requires initiators and targets to maintain some memory buffer space to hold this data during processing. Normally, this memory is not contiguous, but organized as a list of memory buffers, called scatter-gather list.

iSCSI is a standard protocol to facilitate SCSI functionality when operating over TCP/IP transport. iSCSI devices, when communicating with each other, create an initiator-target nexus in the form of iSCSI session. One of the most important implementation goals for iSCSI devices is to achieve adequate or better performance comparing to other available SCSI transport protocols.

iSCSI task is an object that is maintained during the life cycle of a single SCSI command in process. It contains the command state data as well as the buffer space (scatter-gather list) allocated for this particular I/O operation. Task object allocation and the corresponding buffer space allocation lay in the critical path of iSCSI command processing and any allocation delay increases response latency and accordingly reduces performance. Normally, upon arrival of a SCSI command, a new task is allocated, initialized, and then the necessary buffer space is allocated using the system memory allocator (possibly from a system object cache). For a number of reasons, it is difficult to expect the system to allocate the necessary buffer space atomically, i.e., without waiting for the system allocator to find and/or prepare the requested amount of space.

Moreover, the buffer space in question is typically DMA-capable to exclude unnecessary memory to memory transfers. As a result, atomic memory allocation may fail simply because the system memory has become too fragmented. Modern operating systems maintain special emergency buffers in order to deal with these situations, but this will not guarantee the buffers to be DMA-capable.

As one skilled in the art will know, DMA (Direct Memory Access) is a capability provided by some computer bus architectures that allows data to be sent directly from a linked storage resource to the memory on the computer's motherboard. This frees the processor from involvement with the data transfer, improving overall system performance.

In the past, one way of addressing the above-noted problem has been to allocate iSCSI tasks from a system object cache (known on many platforms as "slab cache"). However, it is difficult to control complex objects using this cache alone.

Thus, a need exists for a more efficient way of allocating task objects.

SUMMARY OF THE INVENTION

Briefly, the present invention satisfies the need for a more efficient way of allocating task objects, by reusing task objects along with their previously allocated data buffers.

In accordance with the above, it is an object of the present invention to provide a way to allocate task objects in order to improve performance.

The present invention provides, in a first aspect, a method of allocating a task object and buffer space therefor. The method comprises placing a first task object and first buffer space therefor in a session-level task cache at an end of processing for the first task object, and allocating a second task object and second buffer space therefor from the session-level task cache in response to a request.

The present invention provides, in a second aspect, a method of allocating a task object and buffer space therefor. The method comprises providing a session-level task cache comprising at least one session comprising at least one task object and associated buffer space. The method further comprises determining a best session fit from among the at least one session, in response to a request for a task object and buffer space therefore, and allocating the requested task object and buffer space from the session-level task cache based on the determining.

The present invention provides, in a first aspect, a method of allocating a task object and buffer space therefor using a network storage controller programmed to perform the method. The method comprises placing a first task object and first buffer space therefor in a session-level task cache of the network storage controller at an end of processing for the first task object, and allocating a second task object and second buffer space therefor from the session-level task cache in response to a request.

The present invention provides, in a second aspect, a method of allocating a task object and buffer space therefor using a network storage controller programmed to perform the method. The method comprises determining a session fit from among at least one session in a session-level task cache of the network storage controller, the at least one session comprising at least one task object and associated buffer space, the determining in response to a request for a task object and buffer space therefore, and allocating the requested task object and buffer space from the session-level task cache based on the session size fit determined.

The present invention provides, in a third aspect, a method of managing memory for task objects and associated buffer space. The method comprises reclaiming at least a portion of a previously allocated session-level task cache of a network storage controller, the session-level task cache comprising at least one task object and associated buffer space, if a predetermined condition exists.

These, and other objects, features and advantages of this invention will become apparent from the following detailed description of the various aspects of the invention taken in conjunction with the accompanying drawings.

DETAILED DESCRIPTION OF THE INVENTION

The present invention improves the performance of iSCSI task object allocation by refraining from object destruction, instead reusing iSCSI task objects along with their previously allocated data buffers, thereby significantly improving task allocation performance.

Figure 1:
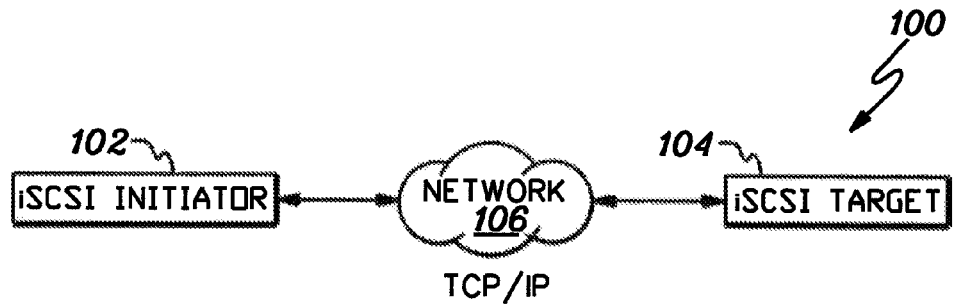
FIG. 1 is a block diagram of one example of a computing environment implementing the method of the present invention.
Figure 2:
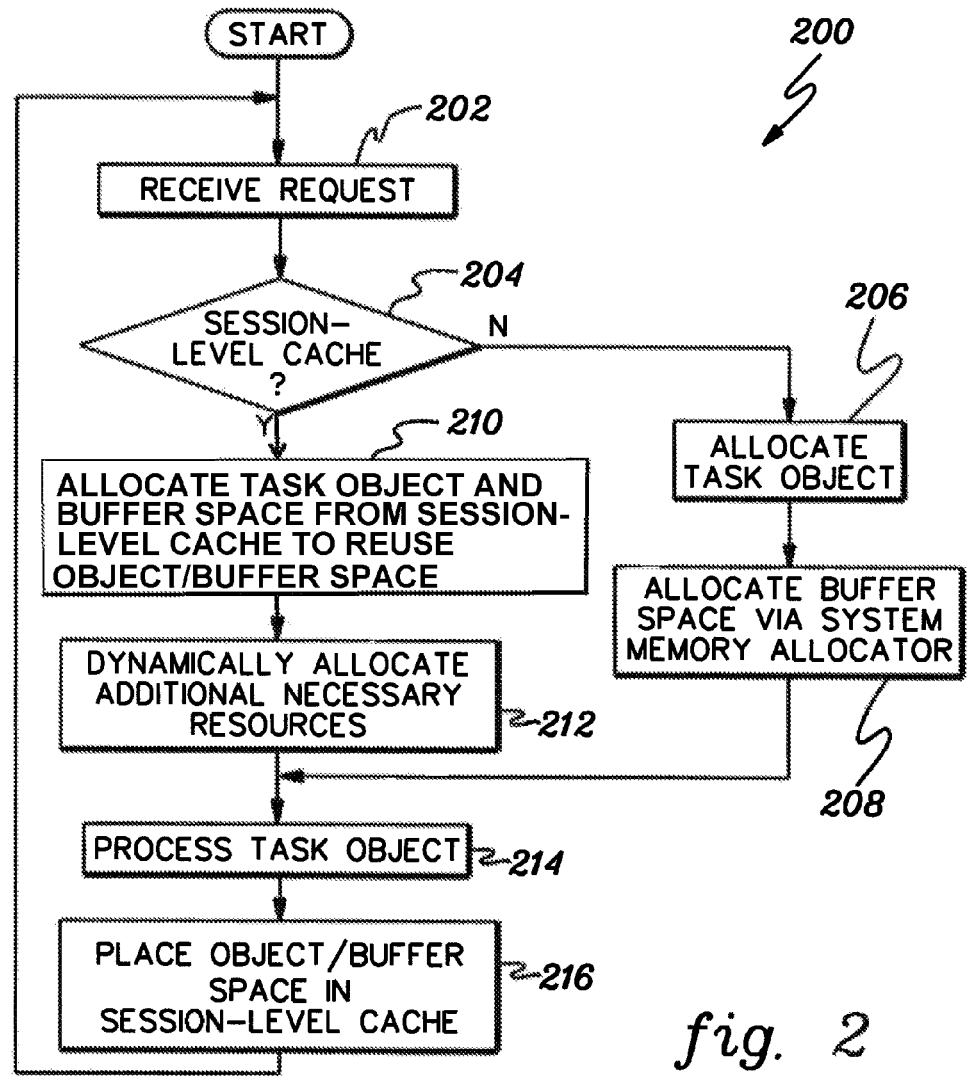
FIG. 2 is a flow diagram for one example of a method of allocating a task object and associated buffer space in accordance with one aspect of the present invention.

FIG. 1 is a block diagram of one example of a computing environment implementing the method of the present invention. The computing environment comprises a network 100, including an iSCSI initiator 102, an iSCSI target 104, and the remainder 106 of the network. The network is, for example, a local area network or wide area network. The network utilizes, for example, TCP/IP as the communication protocol. Initiator 102 is, for example, a network client computing unit, and target 104 is, for example, a network storage resource. It will be understood that a storage controller and driver associated with the network storage resource is also present, the storage controller including memory cache, both omitted herein for simplification. The client and storage controller for the target preferably run a UNIX or UNIX derivative operating system, for example, LINUX.

In accordance with an aspect of the present invention, one example of a method of allocating a task object and associated buffer space is described with reference to the session-level cache is provided by the present invention to hold an object and its associated buffer space for use by a subsequent task. The session-level cache can be physically located, for example, in the controller for the target. When a request from initiator 102 is received by target 104 (Step 202), it is initially determined whether the session-level cache can accommodate the request (Inquiry 204). If the session-level cache cannot accommodate the request (e.g., this is the first request), the normal course of task/buffer allocation takes place; that is, the task object is allocated by the driver for target 104 (Step 206) and associated buffer space is determined and allocated by the system memory allocator (not shown; Step 208, typically part of the operating system)

In an alternate embodiment, the session-level cache is created prior to the first request with a predetermined amount of space. More specifically, the session-level cache is pre-loaded with one or more task objects prior to a first request. For example, the session-level cache can be pre-loaded with one or more task objects at creation. In this way, the potential for a performance hit from an initial memory allocation on an empty session-level cache is reduced.

If the session-level cache is determined to be able to accommodate the task and buffer space for the request, it is so allocated (Step 210). If the session-level cache proves to be inadequate, necessary additional resources are allocated (Step 212) by the system memory allocator. The task is then processed normally regardless of the method of allocation (Step 214), and the object and associated buffer space are placed in the session-level cache (Step 216), as the system receives another request (method returns to Step 202). The session-level cache not only improves performance, but can also be considered a memory reserve to ensure that requests are timely processed during periods of high workload.

In an alternate embodiment, where there are multiple sessions of different buffer space size in the session-level cache, a determination could be made as to which one best fits (overall best fit, whether smaller or larger than needed) a new request, in order to minimize the use of the system memory allocator. Where the best-fit session buffer space is larger than needed, allocation proceeds. However, where the best-fit session buffer space is too small, additional resources (e.g., a specific amount of memory) are requested from and allocated by the system memory allocator. Similarly, all or a portion of the session-level cache could periodically be reclaimed or reassigned to address resource needs elsewhere, or generally to improve system performance. In one example, a portion of the session-level cache is reclaimed when a given session in the cache has not been reused for a predetermined amount of time.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to particular transport protocols, such embodiments are only examples. Other types of protocols and computing environments can benefit from the present invention and, thus, are considered a part of the present invention.

The capabilities of the present invention can be implemented in software, firmware, hardware or some combination thereof As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of allocating a task object and buffer space therefor using a network storage controller programmed to perform the method, the method comprising:
    determining a session size fit from among at least one session in a session-level task cache of the network storage controller, the at least one session comprising at least one previously allocated task object and associated buffer space, the determining in response to a request for a task object and buffer space therefore, wherein each of the at least one task object and the requested task object comprises an iSCSI task object;
    allocating the requested task object and buffer space from the session-level task cache based on the session size fit determined;
    wherein if the session size fit determined comprises a larger buffer space than required by the request, then the determined session is allocated with the larger buffer space;
    wherein if the session size fit determined comprises a smaller buffer space than required by the request, then the determined session is allocated with the additional buffer space required by the request; and
    wherein each of the at least one task object and the requested task object comprises an iSCSI task object.

2. A method of managing memory for task objects and associated buffer space, the method comprising:
    reclaiming at least a portion of a previously allocated session from a session-level task cache of a network storage controller in response to a request, the session comprising at least one iSCSI task object and a predetermined amount of associated buffer space, if a predetermined condition exists
    wherein if the session size comprises a larger buffer space than required by the request, then the session is allocated with the larger buffer space;
    wherein if the session size comprises a smaller buffer space than required by the request, then the session is allocated with the additional buffer space required by the request; and
    wherein the predetermined condition comprises one of a predetermined time period of nonuse of the at least a portion of the session-level task cache, to address network resource needs, and to improve performance.

3. Apparatus for allocating a task object and buffer space therefor, the apparatus comprising:
    a network storage controller, comprising a session-level task cache storing a plurality of task objects and associated buffer space from an end of processing therefor, the network storage controller further comprising memory storing a driver for the network storage controller to determine a size fit from among the plurality of task objects and associated buffer space, and to allocate a task object and associated buffer space from the session-level task cache based on the size fit in response to a request in order to reuse at least some of the task object and associated buffer space from the plurality of task objects and associated buffer space
    wherein if the size fit determined comprises a larger buffer space than required by the request, then the determined task object and associated buffer space is allocated with the larger buffer space;
    wherein if the size fit determined comprises a smaller buffer space than required by the request, then the determined task object and associated buffer space is allocated with the additional buffer space required by the request; and
    wherein each of the plurality of task objects comprises an SCSI task object.

4. The apparatus of claim 3, wherein the driver further allocates any additional resources necessary for the determined task object.

5. Apparatus for allocating a task object and buffer space therefor, the apparatus comprising:
    a network storage controller comprising:
    a session-level task cache comprising at least one session comprising at least one previously allocated task object and associated buffer space, wherein at least one of the at least one session comprises a predetermined amount of buffer space; memory storing a driver to;
    determine a session size fit from among the at least one session, in response to a request for a task object and buffer space therefore;
    allocate the requested task object and buffer space from the session-level task cache based on the session size fit determined;
    wherein if the at least one session comprises a session having a larger buffer space than required by the request, then the driver stored in the memory proceeds to allocate the larger buffer space;
    wherein if the at least one session comprises a session having a smaller buffer space than required by the request, then the driver stored in the memory allocates additional buffer space required by the request; and
    wherein each of the at least one task object and the requested task object comprises an iSCSI task object.

6. Apparatus for managing memory for task objects and associated buffer space, the apparatus comprising:
    a network storage controller comprising:
    a session-level task cache comprising at least one previously allocated iSCSI task object and a predetermined amount of associated buffer space for re-allocation; memory storing a driver for the network storage controller to reclaim at least a portion of the session-level task cache if a predetermined condition exists;
    wherein if the at least a portion comprises a larger buffer space than required by the request, then the at least a portion is allocated with the larger buffer space;
    wherein if the at least a portion comprises a smaller buffer space than required by the request, then the at least a portion is allocated with the additional buffer space required by the request; and
    wherein the predetermined condition comprises one of a predetermined time period of nonuse of the at least a portion of the session-level task cache, to address network resource needs, and to improve performance.

7. At least one program storage device readable by a network storage controller and embodying at least one program of instructions executable by the network storage controller to perform a method of allocating a task object and buffer space therefor, the method comprising:

provantage a session-level task cache comprising at least one session comprising at least one task object and associated buffer space, wherein at least one of the at least one session comprises a predetermined amount of buffer space;

determining a session size fit from among the at least one session, in response to a request for a task object and buffer space therefore, wherein each of the at least one previously allocated task object and the requested task object comprises an iSCSI task object;

allocating the requested task object and buffer space from the session-level task cache based on the determining;

wherein if the session size fit determined comprises a larger buffer space than required by the request, then the determined session is allocated with the larger buffer space;

wherein if the session size fit determined comprises a smaller buffer space than required by the request, then the determined session is allocated with the additional buffer space required by the request; and wherein each of the at least one task object and the requested task object comprises an iSCSI task object.

8. At least one program storage device readable by a network storage controller and embodying at least one program of instructions executable by the network storage controller to perform a method of managing memory for task objects and associated buffer space, the method comprising:

providing a session-level task cache comprising at least one previously allocated iSCSI task object and associated buffer space for re-allocation;

reclaiming at least a portion of the session-level task cache if a predetermined condition exists;

wherein if the at least a portion of the session-level task cache comprises a lamer buffer space than required, then it is allocated with the lamer buffer space;

wherein if the at least a portion of the session-level task cache comprises a smaller buffer space than required, then it is allocated with the additional buffer space required by the request; and wherein the predetermined condition comprises one of a predetermined time period of nonuse of the at least a portion of the session-level task cache, to address network resource needs, and to improve performance.

* * * * *

UNITED STATES PATENT AND TRADEMARK OFFICE
CERTIFICATE OF CORRECTION

PATENT NO. : 7,721,025 B2  Page 1 of 1
APPLICATION NO. : 11/470539
DATED : May 18, 2010
INVENTOR(S) : Dmitry Fomichev It is certified that error appears in the above-identified patent and that said Letters Patent is hereby corrected as shown below:

Title page Assignee item (73): Delete "NY" and insert --NJ--

Claim 8, at Column 8, Line 12 and Line 13: Delete "lamer" and insert --larger--

Signed and Sealed this

Thirteenth Day of July, 2010

David J. Kappos
*Director of the United States Patent and Trademark Office*